(12) United States Patent
Ball

(10) Patent No.: US 6,825,417 B2
(45) Date of Patent: Nov. 30, 2004

(54) SLIDE AND SNAP CABLE END FITTING

(75) Inventor: Charles Ball, Southfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/355,963

(22) Filed: Jan. 31, 2003

(65) Prior Publication Data

US 2004/0149480 A1 Aug. 5, 2004

(51) Int. Cl.[7] .............................................. H02G 15/02
(52) U.S. Cl. ...................... 174/74 R; 174/77 R; 439/8; 439/350
(58) Field of Search .............................. 174/74 R, 77 R, 174/79, 81, 84 R, 84 S, 85, 86, 88 R, 91, 94 S; 439/350, 8

(56) References Cited

U.S. PATENT DOCUMENTS

| | | | | |
|---|---|---|---|---|
| 5,154,093 A | * | 10/1992 | Dickirson | 74/501.5 R |
| 5,211,461 A | * | 5/1993 | Teufel et al. | 312/334.4 |
| 5,211,576 A | * | 5/1993 | Tonkiss et al. | 439/462 |
| 5,240,424 A | * | 8/1993 | Honma et al. | 439/95 |
| 5,276,280 A | * | 1/1994 | Ball | 174/65 R |
| 5,823,813 A | * | 10/1998 | Dye | 439/347 |
| 5,862,710 A | * | 1/1999 | Koenig | 74/502.4 |
| 5,884,531 A | * | 3/1999 | Koenig | 74/502.4 |
| 6,290,525 B1 | * | 9/2001 | Jacobi | 439/319 |
| 6,435,056 B2 | | 8/2002 | Meyer | |
| 2001/0029658 A1 | | 10/2001 | Meyer | |
| 2002/0189390 A1 | | 12/2002 | Mayville et al. | |

* cited by examiner

Primary Examiner—William H. Mayo
(74) Attorney, Agent, or Firm—Ralph E. Smith

(57) ABSTRACT

A cable end fitting assembly, adapted for attachment to a mounting plate in a motor vehicle, has a circumferential groove for receiving the edge of the mounting plate. A second part of the assembly is rotatable relative to the circumferential groove, and has a thumb pad for pressing the assembly into a recess in the mounting plate. The thumb pad also serves to align the assembly in the recess so that resilient projections extending from the assembly can engage indentations in the recess to secure the assembly to the mounting plate.

5 Claims, 3 Drawing Sheets

SLIDE AND SNAP CABLE END FITTING

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates generally to cable end fittings for securing a cable to a mounting bracket. In one of its aspects, the invention relates to an end fitting for an automatic transmission cable.

2. Description of Related Art

Transmission cables can sometimes be difficult to install in a vehicle on the assembly line. A cable is generally housed in a sleeve that is attached to the vehicle by cable end fittings. The installer must ensure that the cable end fittings are secured relative to the shifter and the transmission shift linkage so that the cable moving within the sleeve is anchored and moves the shift linkage commensurate with what is indicated by the shift lever to the vehicle driver.

Often the bracket adapted to hold the transmission cable end fitting is at an awkward angle, so that it is difficult for the installer to maneuver the cable into the bracket and exert sufficient force to fully engage the end fitting in the bracket. This causes excessive strain on the installer. It is not only difficult for the installer to physically maneuver the end fitting into the bracket, but it is also difficult to visually inspect that the end fitting is fully engaged within the bracket. For instance, with an "arrowhead" type end fitting that must be fully seated into an aperture in a mounting bracket, one of the resilient "wings" of the arrowhead may not fully engage the mounting bracket. Once the vehicle is in operation, vibration may cause the end fitting to disengage from the bracket. This can cause an unsafe operating condition if the transmission is not in the gear indicated to the vehicle operator by the shift lever.

It would be advantageous to provide an end fitting and bracket assembly that is more ergonomically suited for installation without putting an undue strain on the installer. It would also be advantageous to provide a cable end fitting that demonstrates to the installer full engagement of the cable end fitting with a mounting bracket.

BRIEF SUMMARY OF THE INVENTION

A cable end fitting assembly comprising a first portion including a circumferential groove for receiving an edge of a mounting plate, and a second portion rotatably connected to the first portion, the second portion comprising a semicircular spring with ears and a thumb pad for pressing the assembly into a recess in the mounting plate and for aligning the assembly within the recess to engage the ears with complementary indentations in the recess.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

Referring to FIGS. 1–5, a cable end fitting 100 according to the invention is attached at a first end to a primary cable sleeve 10 and incorporates a swivel body 120 at a second end for attachment to a secondary cable sleeve 20.

Figure 5:
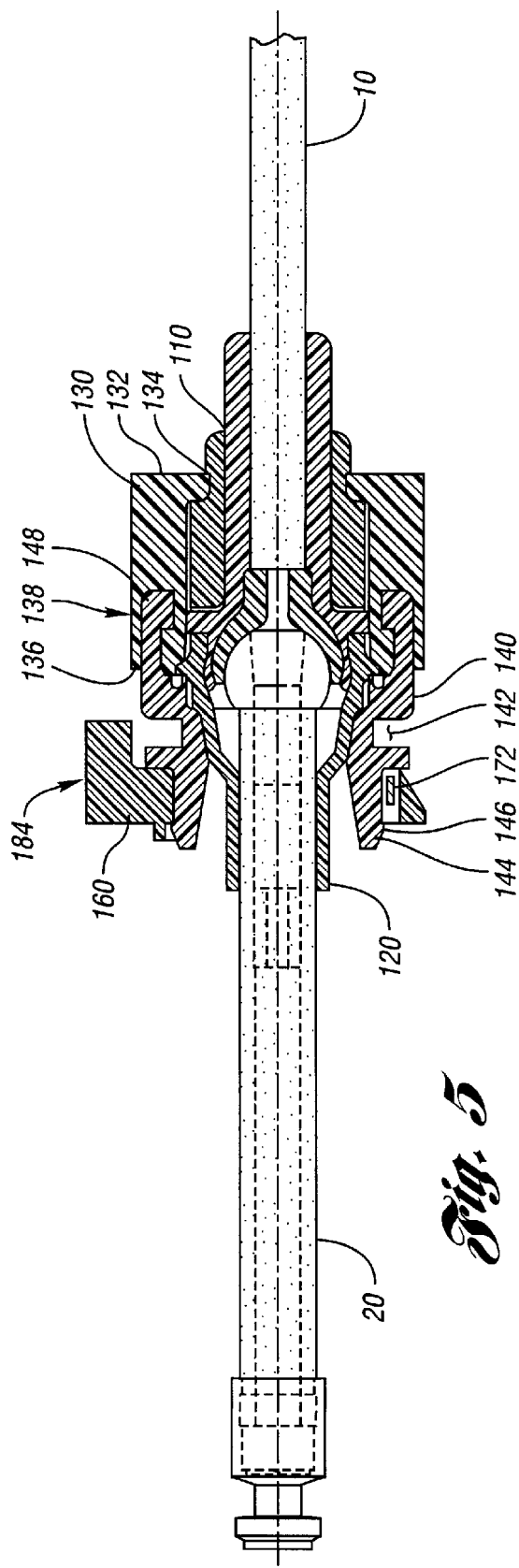
FIG. 5 is a cross-sectional view taken through line 5—5 of FIG. 4.

The interior of the cable end fitting 100, as shown in FIG. 5, is formed of a cable interface 110 and swivel body 120 for securing the primary cable sleeve 10 to the cable end fitting 100, and for allowing some flexibility of movement of the secondary cable sleeve 20 in a radial direction from the centerline of the cable end fitting 100. The cable interface 110 and swivel body 120 are contained within a two-piece body of the cable end fitting 100.

The primary body portion 130 is substantially cylindrical, and includes a first end 132 having an aperture 134 for receiving the primary cable sleeve 10 in cable interface 110. Opposite the first end 132, the primary body portion 130 has a substantially open second end 136 for receiving a body mounting portion 140 of the cable end fitting 100. The primary body portion 130 and the body mounting portion 140 of the cable end fitting 100 include complementary clips 138, 148 for assembling them together in a substantially permanent manner, to enclose the cable interface 110 and swivel body 120.

The body mounting portion 140 is generally tubular in form. The interior of the body mounting portion 140 is contoured to receive the swivel body 120 and permit the swivel body 120 freedom of movement in all directions about the centerline of the cable end fitting 100. The exterior of the body mounting portion 140 includes the clips 148 for assembling the body mounting portion 140 to the primary body portion 130, a circumferential groove 142 for receiving an edge of a planar portion of a mounting bracket 200 (FIG. 6), and a tapered tubular end portion 144. The tapered tubular end portion 144 is adapted to axially receive a spring clip assembly 160, and includes an exterior circumferential barb 146 for retaining the spring clip assembly 160.

The spring clip assembly 160 comprises a spring clip 170 and a spring clip body 180. The spring clip body 180 is generally in the form of a ring and is molded of a composite material or plastic. The spring clip body 180 comprises a ring portion 182, and further comprises a thumb pad 184. The thumb pad 184 includes a riser portion 186 extending radially from the ring portion 182 and a planar portion 188 perpendicular to the riser portion 186. The planar portion 188 is also generally perpendicular to the plane of the ring portion 182, and generally parallel to a side of the ring portion 182, in the manner of a tangent. The planar portion 188 includes a plurality of raised integrally molded ribs 190.

The spring clip 170 is in the form of a C-shaped ring 172 formed of spring steel and having an L-shaped leg 174 extending from each end of the ring 172. Each L-shaped leg 174 has a stem portion 176 and a base portion 178, and is oriented so that the base portion 178 is generally perpendicular to the plane of the ring 172 and is positioned outwardly of the defined ring 172 of the spring clip 170. The spring clip 170 can be integrated into the spring clip body 180 during molding of the spring clip body 180, as in the embodiment illustrated, or can be attached to the spring clip body 180 after molding. In the disclosed embodiment, one of the L-shaped legs 174 is positioned on each side of the thumb pad 184.

The spring clip assembly 160 is adapted to resiliently slide onto the tapered tubular end portion 144 of the body mounting portion 140. The spring clip assembly 160 is then axially retained on the tapered tubular end portion 144 by the exterior circumferential barb 146. The spring clip assembly 160 can rotate freely about a central axis of the cable end fitting 100 relative to the body mounting portion 140.

Figure 1:
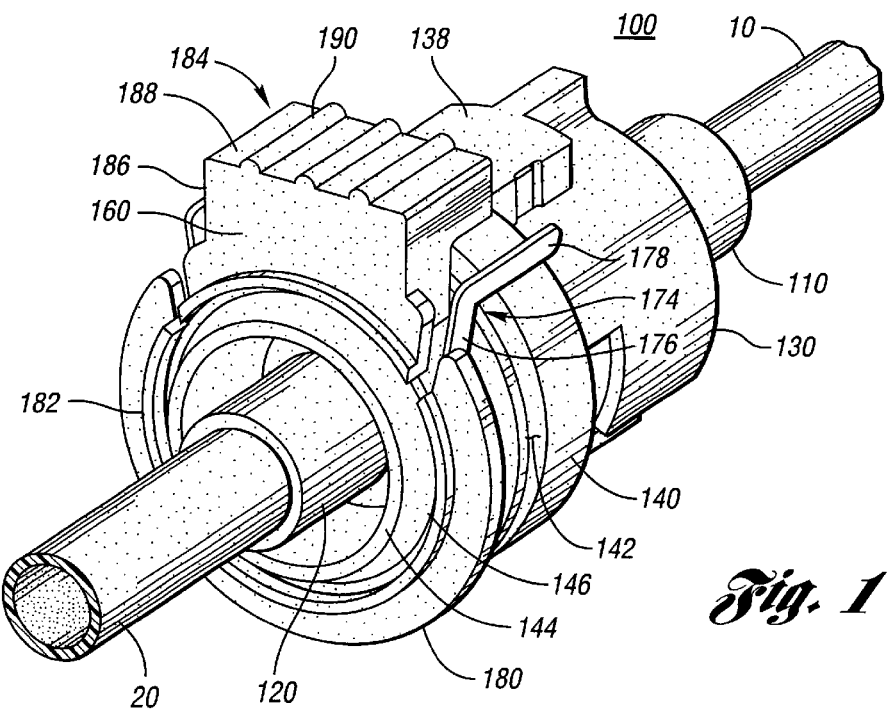
FIG. 1 is a perspective view of a cable end fitting according to the invention.
Figure 2:
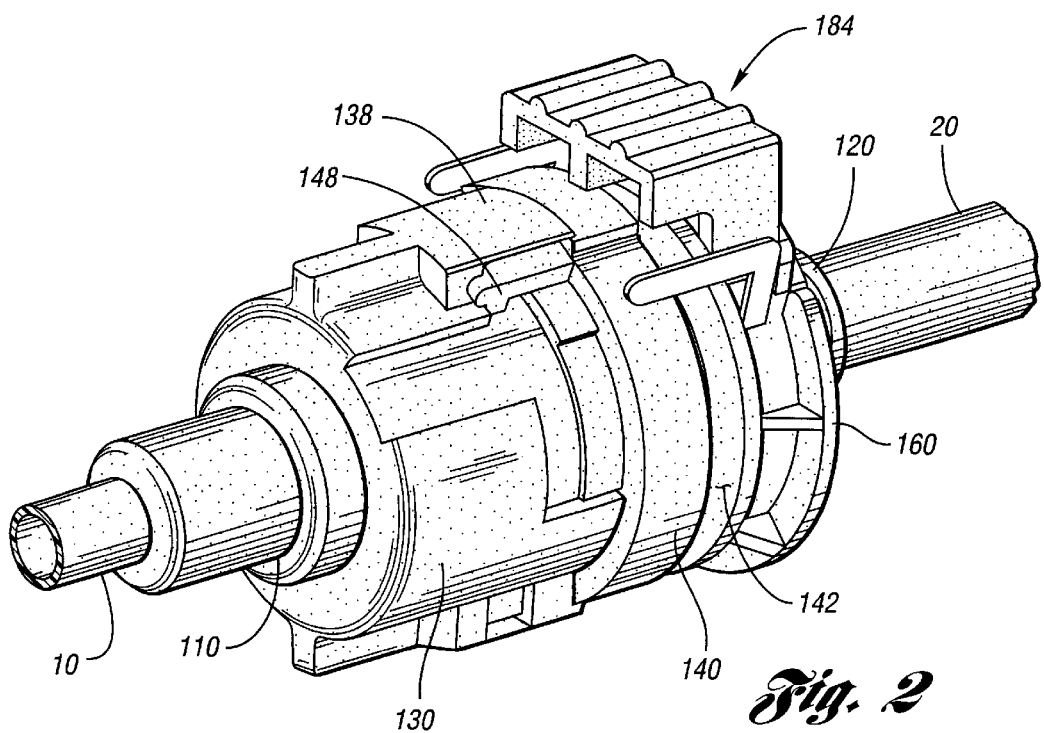
FIG. 2 is a rear perspective view of the cable end fitting of FIG. 1.
Figure 3:
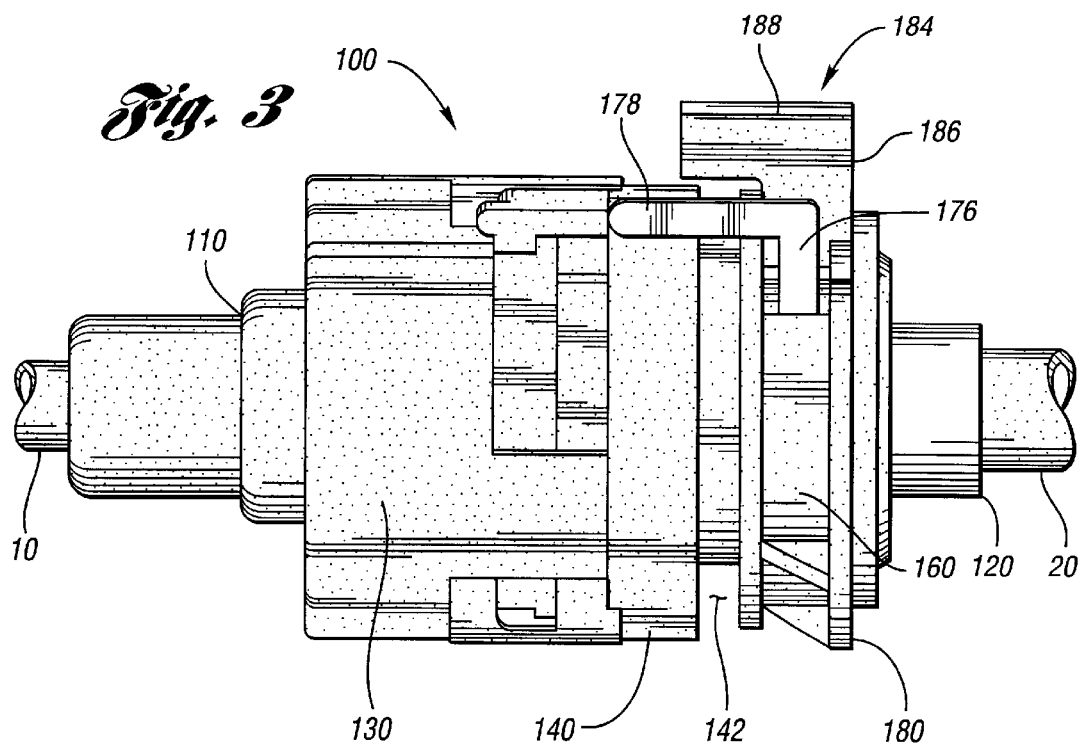
FIG. 3 is a side view of the cable end fitting of FIGS. 1–2.

Referring with particularity to FIG. 3, the spring clip assembly 160 has been received onto the body mounting portion 140. As shown in FIG. 3, a portion of the L-shaped leg 174 of the spring clip 170 extends axially over the circumferential groove 142 formed in the body mounting portion 140. Likewise, the planar portion 188 of the thumb pad 180 extends over the circumferential groove 142.

Figure 4:
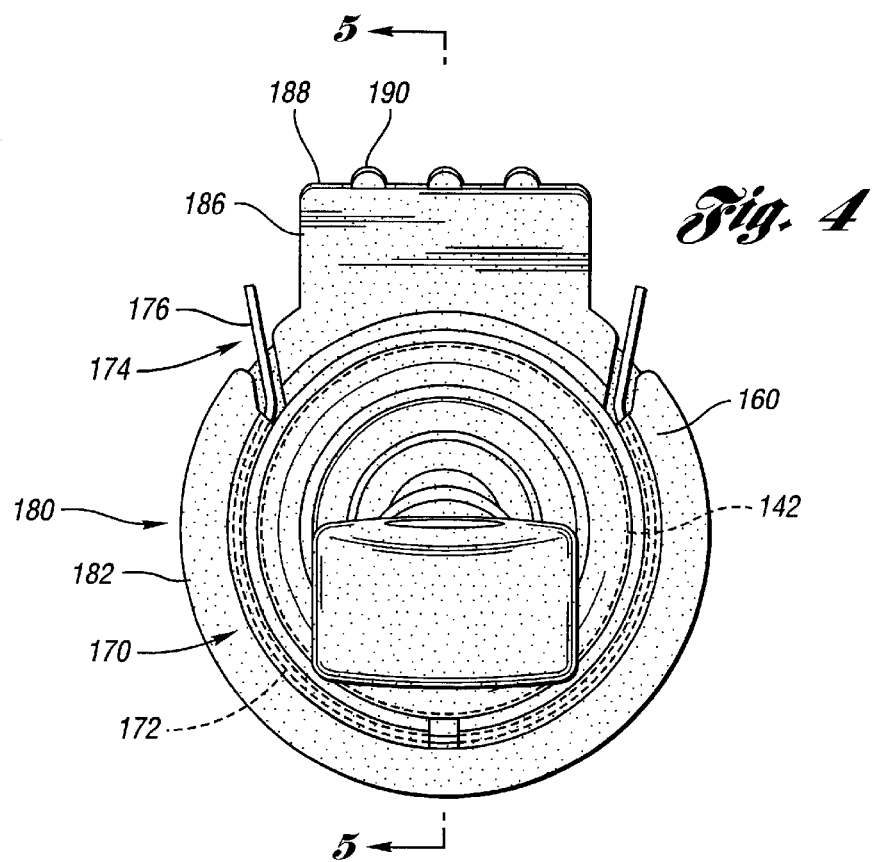
FIG. 4 is an end view of the cable end fitting of FIGS. 1–3.

Referring to FIG. 4, the L-shaped leg 174 of the spring clip 170 also extends outwardly from a vertical centerline of the cable end fitting 100 farther than the circumferential groove 142 (shown in phantom).

Figure 6:
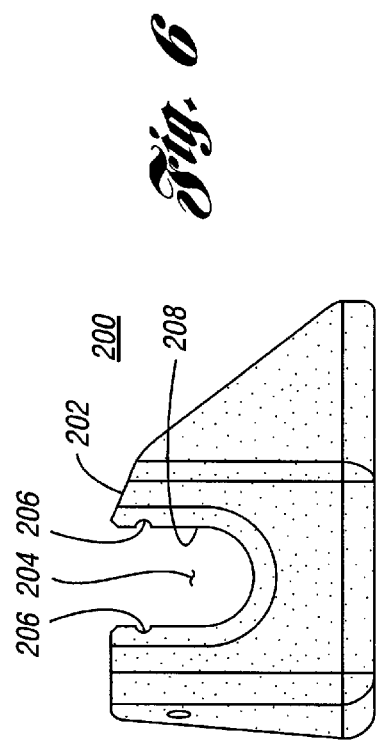
FIG. 6 is a perspective view of a bracket adapted for mounting the cable end fitting of FIGS. 1–5.

The assembly is secured to a vehicle by placing the cable end fitting 100 onto a mounting bracket 200, shown in FIG. 6. The mounting bracket 200 includes a planar portion 202 forming a semi-circular recess 204. The planar portion 202 has a thickness adapting it to be closely received within the circumferential groove 142 of the body mounting portion 140. The semi-circular recess 204 is formed to closely receive the body mounting portion 140 therein by having a diameter slightly larger than the diameter of the body mounting portion 140 within the circumferential groove 142. The recess 204 further includes a pair of indentations 206 each positioned and adapted to receive the base portion 178 of an L-shaped leg 174 of the spring clip 170.

The sides 208 of the semi-circular recess 204 are formed to closely receive the circumferential groove 142, with the indentations 206 extending further outwardly than sides 208. Because the L-shaped legs 174 extend outwardly from the circumferential groove 142 and are resilient, the base portion 178 of each L-shaped leg 174 will flex inwardly as the cable end fitting 100 is inserted into the semi-circular recess 204. When the base portion 178 of each L-shaped leg 174 reaches a respective indentation 206, it returns to its natural position, engaging the indentation 206 and locking the cable end fitting 100 in position on the mounting bracket 200.

The cable end fitting 100 is placed onto the mounting bracket 200 by an operator grasping the fitting 100 and placing a thumb on the thumb pad 180. The ability of the spring clip assembly 160 to rotate freely about the central axis of the cable end fitting 100 enables the operator to easily align the spring clip assembly 160 with the mounting bracket 200 without twisting the cable.

As the operator directs the cable end fitting 100 onto the mounting bracket 200, the planar portion 202 of the mounting bracket 200 slides into the circumferential groove 142. The thumb pad 180 is wide enough that it restricts the orientation of the spring clip assembly 160 within the recess 204 of the mounting bracket 200 within of few degrees of "vertical." With the spring clip assembly 160 thus in the proper orientation, the L-shaped legs 174 of the spring clip 170 align with the indentations 206 of the semi-circular recess 204. The thumb pad 180 thus provides the operator with a sure purchase on the spring clip assembly 160 and a natural means of properly aligning the spring clip assembly 160 with the mounting bracket 200.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A cable end fitting assembly comprising a first portion including an external groove for receiving an edge of a mounting plate, the mounting plate comprising a recess for receiving the cable end fitting assembly and a second portion rotatably connected to the first portion, the second portion comprising:

at least one resilient leg radially outward of and extending over the external groove; and a thumb pad for orienting the assembly within the recess to engage the resillient leg with an indentation in the mounting plate, the thumb pad overlying a portion of the external groove.

2. The cable end fitting assembly according to claim 1, wherein the at least one resilient leg is oriented transversely to the external groove.

3. The cable end fitting assembly according to claim 1, wherein the thumb pad is further adapted to be contacted by an installer for pressing the assembly into the recess in the mounting plate.

4. A cable assembly comprising:

a cable;

a cable sleeve assembly comprising a primary sleeve and a secondary sleeve;

a cable end fitting comprising
      a groove adapted to receive the edge of a plate of a mounting bracket,
      a resilient member comprising at least one leg parallel to the cable, and
      a thumb pad having a substantially flat surface parallel to the cable and extending over a portion of the groove; and a mounting bracket including a plate-like portion having a semi-circular edge opening adapted to receive the cable end fitting, and including an indentation for receiving the at least one leg when the cable end fitting is inserted into the edge opening-using the thumb pad.

5. A cable end fitting adapted to attach to a mounting bracket having a planar portion with a recess, the cable end fitting comprising:

a body portion attached to and surrounding a cable within a cable sleeve and including an external circumferential groove;

a mounting portion rotatably attached to the body portion, the mounting portion comprising:
      an attachment portion for rotatably connecting the mounting portion to the body portion;

an alignment portion extending radially away from the attachment portion, and including a planar portion extending parallel to the body portion and over a portion of the circumferential groove; and a locking portion including a resilient leg extending over a portion of the circumferential groove, wherein the body portion is adapted to be received in the recess, the external circumferential groove is adapted to receive the planar portion, and the alignment portion is adapted to align the mounting portion within the recess so that the locking portion can engage an indentation in the mounting bracket for securing the mounting portion in the mounting bracket.

* * * * *